United States Patent
Rudy et al.

(10) Patent No.: US 8,136,992 B2
(45) Date of Patent: Mar. 20, 2012

(54) HYDROSTATIC MOUNTING

(75) Inventors: Dietmar Rudy, Kleinbundenbach (DE); Wolfgang Bauer, Riegelsberg (DE)

(73) Assignee: Schaeffler KG, Herzogenaurach (DE)

( * ) Notice: Subject to any disclaimer, the term of this patent is extended or adjusted under 35 U.S.C. 154(b) by 321 days.

(21) Appl. No.: 12/559,795

(22) Filed: Sep. 15, 2009

(65) Prior Publication Data
US 2010/0067835 A1 Mar. 18, 2010

(30) Foreign Application Priority Data
Sep. 16, 2008 (DE) .................. 10 2008 047 297

(51) Int. Cl.
*F16C 32/06* (2006.01)

(52) U.S. Cl. .......................... 384/12; 384/15

(58) Field of Classification Search .............. 384/12, 384/15, 16
See application file for complete search history.

(56) References Cited

U.S. PATENT DOCUMENTS

| | | | | |
|---|---|---|---|---|
| 4,978,233 A | * | 12/1990 | Stotzel et al. | 384/12 |
| 2004/0042689 A1 | * | 3/2004 | Wasson et al. | 384/12 |
| 2006/0251346 A1 | * | 11/2006 | Wasson et al. | 384/12 |
| 2008/0199111 A1 | * | 8/2008 | Rudy et al. | 384/12 |
| 2010/0067836 A1 | * | 3/2010 | Bauer et al. | 384/12 |

* cited by examiner

*Primary Examiner* — Thomas R Hannon
(74) *Attorney, Agent, or Firm* — Lucas & Mercanti, LLP

(57) ABSTRACT

A hydrostatic mounting of longitudinally displaceably arranged machine parts, which have pressure pockets for hydraulic fluid for building up a hydrostatic pressure between two machine parts, gaps for the hydraulic fluid which are adjacent to the pressure pockets and are delimited by gap faces of the two machine parts, drainage for the reception of hydraulic fluid, and at least one seal arranged between the machine parts and surrounding the drainage sealing against leakage of hydraulic fluid out of the hydrostatic mounting. At least one circumferential portion of the seal has an outer sealing lip and an inner sealing lip. The inner sealing lip is adjacent to the gaps, and a vacuum-loadable drainage portion of the drainage is arranged between the two sealing lips.

6 Claims, 2 Drawing Sheets

HYDROSTATIC MOUNTING

This application claims the priority of DE 10 2008 047 297.2, filed Sep. 16, 2008, which is incorporated by reference herein.

The present invention relates to a hydrostatic mounting of longitudinally displaceably arranged machine parts, in particular a hydrostatic profile rail guide, in which a guide carriage is mounted hydrostatically on a guide rail.

A hydrostatic profile rail guide became known, for example, from WO2004/020852 A1, in which a guide rail designed with an approximately T-shaped cross-section is surrounded by a guide carriage. The guide carriage has a back and legs which are located on both sides of the guide rail and adjoin the back in one piece, so that the guide carriage has an approximately U-shaped cross-sectional profile. The free ends of each leg are provided with screw-on flanges which spring toward one another, so that the T-shaped guide rail is surrounded.

In these known hydrostatic profile rail guides, pressure pockets for building up a hydrostatic pressure between the guide rail and the guide carriage are provided on the guide carriage in a known way. Hydraulic fluid is pumped into the pressure pockets via an external pump, so that a pressure cushion is built up between the guide carriage and the guide rail. The hydraulic fluid flows out via gaps which are connected hydraulically to the pressure pockets. The gaps are delimited by gap faces which are formed on the guide carriage and on the guide rail.

Furthermore, this known hydrostatic profile rail guide is provided with drainage in order to receive hydraulic fluid emerging from the gaps. The drainage is connected to a return duct or a reservoir, so that the hydraulic fluid can be supplied to the pump again and pumped anew into the pressure pockets of the hydrostatic profile rail guides.

Moreover, a seal is provided, which ensures that this known hydrostatic profile rail guide is oil-tight. This seal is arranged effectively between the guide carriage and the guide rail. It has side portions and head portions, in each case at least one of the side portions of the seal which extend along the guide rail being arranged between each leg of the guide carriage and the guide rail. In each case at least one of the head portions of the seal is arranged transversely with respect to the guide rail on both head sides of the guide carriage. This seal ensures that, even with the pump switched off, no oil emerges undesirably when the hydrostatic profile rail guide is at a standstill.

The arrangement of the pressure pockets and of the hydraulically connected gaps and also of the drainage and the peripheral seal requires a considerable construction space which, for a given size of a machine part to be supported, is at the expense of the dimensioning of the pressure pockets. In specific applications, a pressure pocket of larger design is desirable, but cannot be implemented in technical terms, because the limited construction space is taken up by the drainage and the seal. This problem concerns, in particular, hydrostatic profile rail guides which lie in the standard construction space of the anti-friction profile rail guides according to DIN 645-1: there is often the wish to replace anti-friction profile rail guides by hydrostatic profile rail guides. Alternatively, the aim may also be to increase the pressure in the pressure pockets. In this case, it may be appropriate to reduce the gap heights of the gaps, so that the hydrostatic fluid flowing out from the pressure pockets meets increased resistance. However, a reduction in the gap height may lead to considerable manufacturing difficulties, because the manufacturing tolerances have to be adapted to the reduced gap heights.

The object of the present invention was to specify a hydrostatic mounting according to the preamble of claim 1 which in a simple way allows an improved utilization of the available construction space.

This object is achieved, according to the invention, by means of the hydrostatic profile rail guide according to claim 1.

Since at least one circumferential portion of the seal is provided with an outer sealing lip and with an inner sealing lip, the inner sealing lip being adjacent to the gaps, and a vacuum-loadable drainage portion of the drainage being arranged between the two sealing lips, several advantages are afforded.

Although it was already known from WO 2004/020852 A1 to execute the head portions of the peripheral seal likewise with an inner and an outer sealing lip, according to the invention, however, the drainage portion is arranged between the two sealing lips. This means, in the first place, that, in the invention, a known successive arrangement of the pressure pocket and of the adjoining gap and also of the adjoining drainage and seal has been shortened, so that, where appropriate, an increased construction space for enlarging the pressure pocket is available.

A further advantage may be seen in that the inner sealing lip may be directly adjacent to the gaps, so that it is possible for hydraulic fluid to flow out from these gaps against increased resistance, since the fact that the inner sealing lip withstands an adjustable pressure means, that the hydraulic fluid does not have ambient pressure at the end of the gap, but, instead, a comparatively increased pressure. As a consequence, therefore, the pressure in the pressure pocket can be increased, without the volume flow of the hydraulic fluid having to be enlarged.

The invention may also be seen in that the drainage portion is integrated into the seal, while, particularly with regard to a double-lip seal, the drainage portion is arranged between the two sealing lips.

According to the invention, the inner sealing lip is arranged adjacently to the gaps; this means that the hydraulic fluid, after it has left or while it is leaving the gap or gaps, arrives at the inner sealing lip. Even if there were to be ducts for hydraulic fluid between the gap and the inner sealing lip, the inner sealing lip is arranged adjacently to the gap in the context of the invention.

In the hydrostatic mounting according to the invention, the circumferential portion according to the invention of the seal is understood to mean a portion of the seal which surrounds the paths provided for the hydraulic fluid. These paths comprise, for example, the pressure pockets, the connected gaps, the drainage and also return ducts or pressure ducts. If therefore, for example, one machine part is designed as a rail and the other part as a rectangular carriage placed onto the rail, the seal can then approximately follow the contour of the rectangular carriage and be installed along this contour. The seal can then prevent an unwanted leakage of hydraulic fluid out of the carriage. A portion of this peripheral seal may then form the circumferential portion according to the invention of the seal. In the example outlined here, that part of the seal which runs along the end face or head side of the rectangular carriage forms a circumferential portion. This circumferential portion may be configured as a circumferential portion according to the invention of the seal. It is, however, also possible to interpret a part of the seal which is arranged along the longitudinal side of the rectangular carriage as a circumferential portion. Developments according to the invention may have the circumferential portion according to the invention on only a fraction of the end-face or longitudinal-side part of the peripheral seal.

In a development according to the invention, the inner sealing lip basically bears sealingly against one machine part. If, however, a pressure drop in front of and behind the inner sealing lip is greater than a predetermined pressure difference, the inner sealing lip lifts off from this machine part, so that the hydraulic fluid can pass the inner sealing lip and enter the drainage portion.

In a simple technical implementation of the invention, the drainage duct is exposed in a known way to a low pressure, so that hydraulic fluid is sucked in. If, then, hydraulic fluid wants to flow out from the gaps surrounding the pressure pockets, it must first overcome a predetermined resistance of the inner sealing lip, and in this case the pressure difference already mentioned will be present for lifting off the inner sealing lip. The hydraulic fluid enters the drainage and is sucked away from there, for example, into a reservoir or is transferred to an external line and is supplied from there to an external pump again.

In this development according to the invention, the outer sealing lip ensures that the hydraulic fluid remains in the drainage portion and can flow only into a connected return duct, in which case the hydraulic fluid can be pumped from there to a preferably external pump, in order then to be supplied anew to the pressure pockets again.

In a particularly beneficial development according to the invention, the circumferential portion, produced from plastic, of the seal connects the inner and the outer sealing lip to one another in one piece, the circumferential portion being provided with a connecting duct which connects the drainage portion to a return duct provided on the one machine part. Seals of this type can be produced cost-effectively preferably by the injection molding method, in which case the connecting duct can easily be allowed for in the injection-molding die. The particular feature of this development according to the invention can be considered in that this seal can be used at the same time as a drainage portion.

Hydrostatic mountings according to the invention are suitable especially for hydrostatic profile rail guides. In a development according to the invention, therefore, there is provision for a guide carriage of a hydrostatic profile rail guide to be provided with a hydrostatic mounting according to the invention. In this case, one machine part is formed by the guide carriage, the other machine part being formed by a guide rail. In this development, the guide carriage has a back and two legs, by which the guide rail can be partially surrounded.

In a guide carriage of this type, a seal according to the invention is arranged effectively between the guide carriage and the guide rail, the seal having a plurality of portions which are formed by side portions and head portions. In each case at least one side portion extending along the guide rail is provided between each leg and the guide rail. In each case at least one of the head portions of the seal, which head portion is arranged transversely with respect to the guide rail, is arranged on both head sides of the guide carriage. In this development according to the invention, the head portion of the seal is provided with the circumferential portion according to the invention of the seal, said circumferential portion carrying the two sealing lips.

Preferably, the seal according to the invention surrounds all the pressure pockets and the gaps adjoining the pressure pockets, the drainage portion, arranged between the two sealing lips, of the circumferential portion of the seal being connected to a return duct of the guide carriage.

The invention is explained in more detail below by means of an exemplary embodiment depicted in a total of four figures in which.

Figure 1:
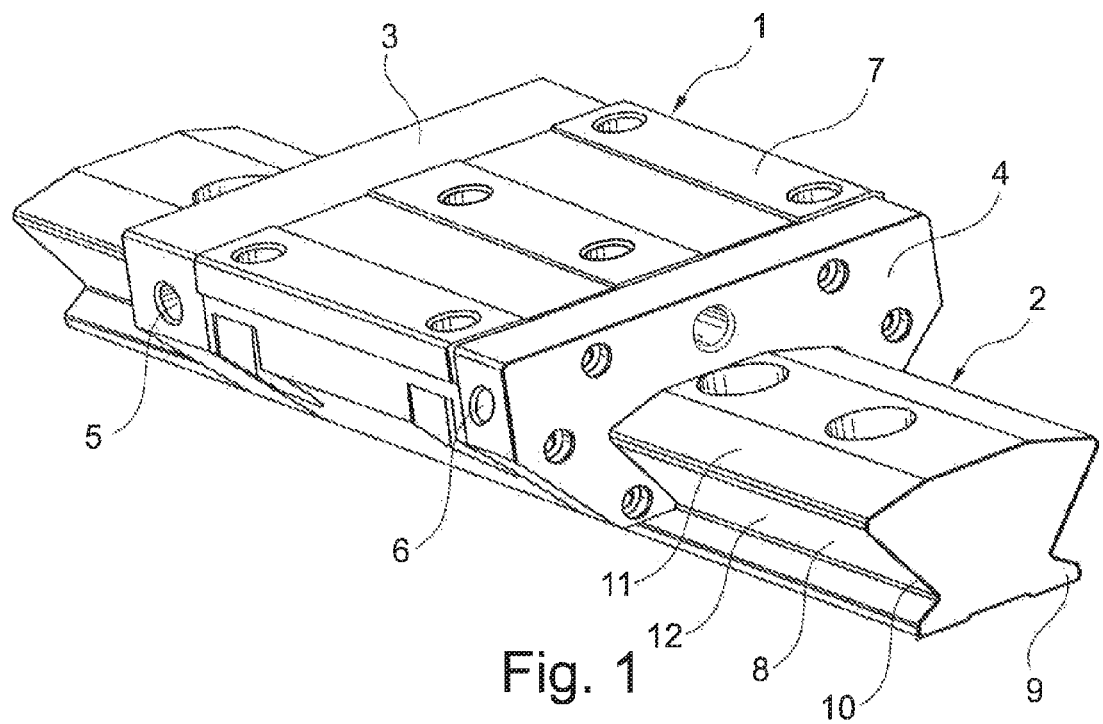
FIG. 1 shows a hydrostatic profile rail guide according to the invention in a perspective illustration.

FIG. 1 shows a perspective illustration of the hydrostatic profile rail guide according to the invention. A guide carriage 1 is mounted hydrostatically on a guide rail 2. The guide carriage 1 is provided with a headpiece 3, 4 on each of its two end faces, the headpiece 3 being provided with a pressure connection 5 and the headpiece 4 being provided with a suction connection 6 for hydraulic fluid. Via a pump, not depicted here, the hydraulic fluid can be pumped via the pressure connection 5 into the head piece 3 and from there via flow-regulating valves, likewise not depicted, into a carrying body 7 of the guide carriage 1. The hydraulic fluid is sucked away from the guide carriage 1 via the suction connection 6 and is supplied anew to the pump, not depicted here.

The guide rail 2 has an approximately anvil-shaped rail head 8 and a rail foot 9, a contracted foot portion 10 being formed between the rail foot 9 and the rail head 8. The rail head 8 is provided on each of its two longitudinal sides with 2 bearing faces 11, 12 which are arranged at an acute angle to one another and extend along the longitudinal axis of the guide rail 2.

Figure 2:
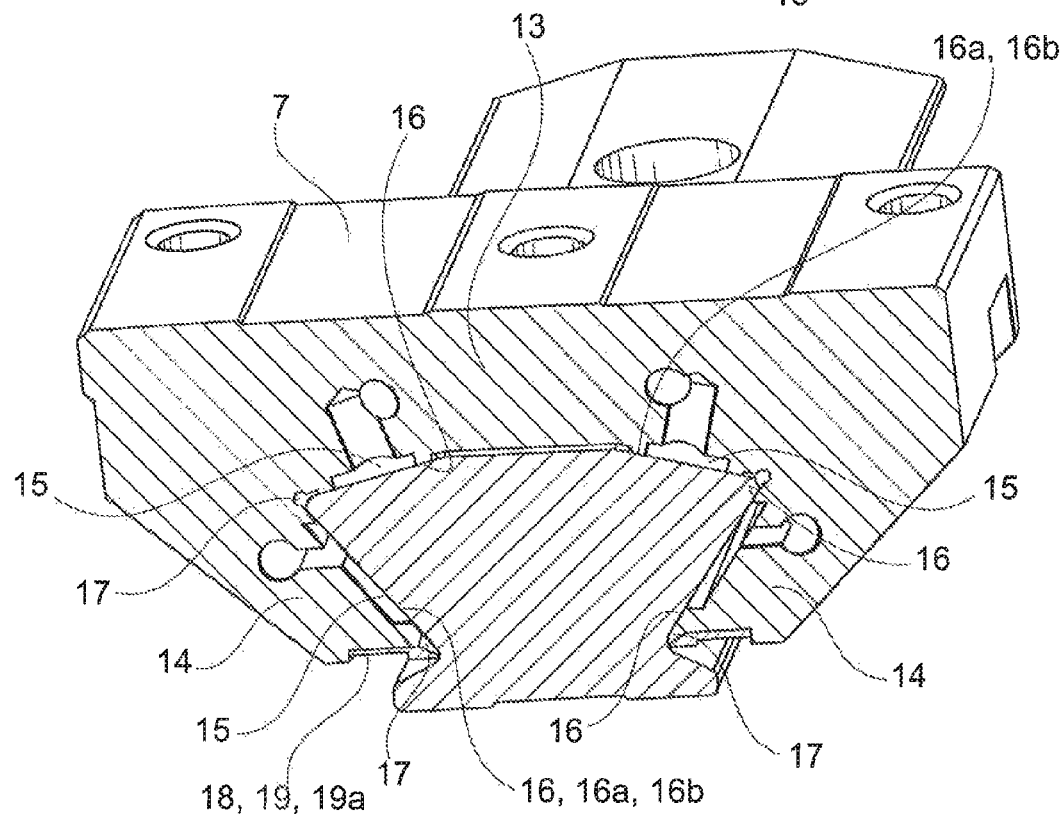
FIG. 2 shows a cross section through the hydrostatic profile rail guide from FIG. 1.

It may be gathered from FIG. 2 that the carrying body 7 has a back 13 and two legs 14 arranged parallel to and at a distance from one another, the carrying body 7 partially surrounding with its two legs 14 the guide rail 2. The carrying body 7 is provided, on each of its inner faces lying opposite the bearing faces 11, 12 of the guide rail 2, with a pressure pocket 15 which extends along the carrying body 7. Gaps 16 adjoin these pressure pockets 15 hydraulically and are formed by gap faces 16a, 16b, lying opposite one another, of the guide carriage 1 and of the guide rail 2. A hydrostatic pressure is built up between the guide carriage 1 and the guide rail 2 via the pressure pockets 15. The hydraulic fluid thus put under pressure flows out via the gaps 16 with a pressure drop and finally leaves the gaps 16 approximately pressureless. The hydraulic fluid, after emerging from the gaps 16, finally enters a drainage 17, and therefore all the pressure pockets 15 are connected to the drainage 17. Via the drainage 17, the hydraulic fluid is sucked away into the head piece 4 and from there via the suction connection 6 out of the guide carriage 1.

In order to ensure that the hydraulic fluid can circulate in a closed circuit, the hydrostatic profile rail guide according to the invention is provided with a seal 18. This seal 18 is of peripheral form, in the sense that the seal 18 completely surrounds the drainage 17. The term "surround" is understood here to mean that the hydraulic fluid can leave the drainage solely via the paths provided and therefore does not leak undesirably out of the hydrostatic profile rail guide.

The seal 18 according to the invention is composed of side portions 19a and head portions 20a, the side portions 19a being formed by side seals 19 and the head portions 20a by head seals 20 which in each case, form a circumferential portion of the seal 18. According to the invention, however, a circumferential portion of the seal is also understood to mean a circumferential part of the head seal, so that, in variants according to the invention, each head seal may be formed from a plurality of portions arranged circumferentially in succession.

It may be gathered particularly from FIG. 2 that the guide rail 2 is provided in the foot portion 10 with one of the side seals 19 on each of the two longitudinal sides of the guide rail 2.

In the exemplary embodiment, the side seal 19 is formed by a lip seal which bears sealingly against the foot portion 10 of the guide rail 2. These side seals 19 extend over the entire movement travel of the guide carriage 1.

Figure 3:
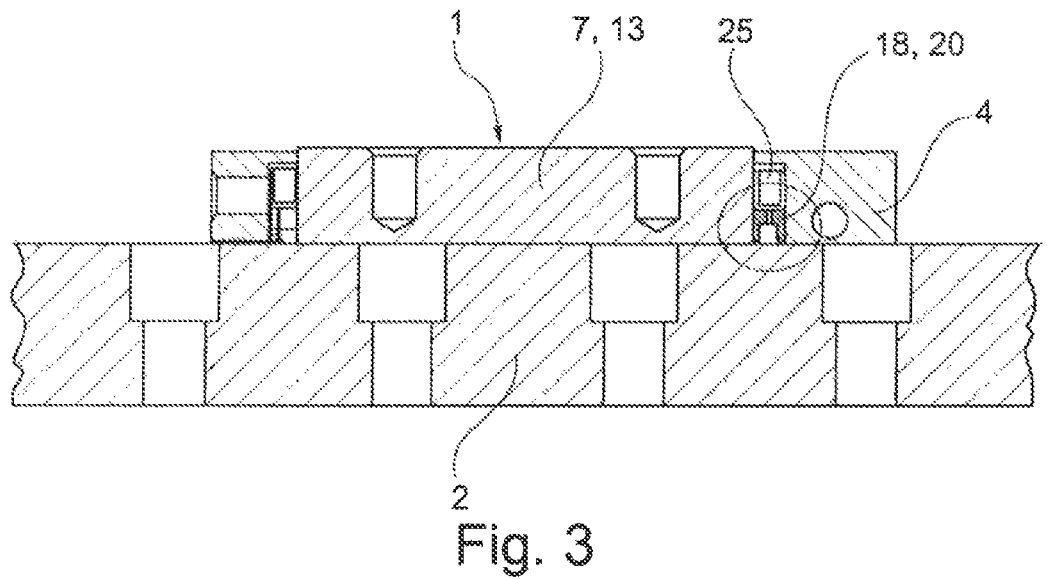
FIG. 3 shows a partial longitudinal section through the hydrostatic profile rail guide.

The two head seals 20 are arranged in the guide carriage 1, specifically in one of the two head pieces 3, 4, each. FIG. 3 shows a partial cross section through the profile rail guide, with the sectional head seal 20 which is depicted in an enlarged illustration in FIG. 4.

Figure 4:
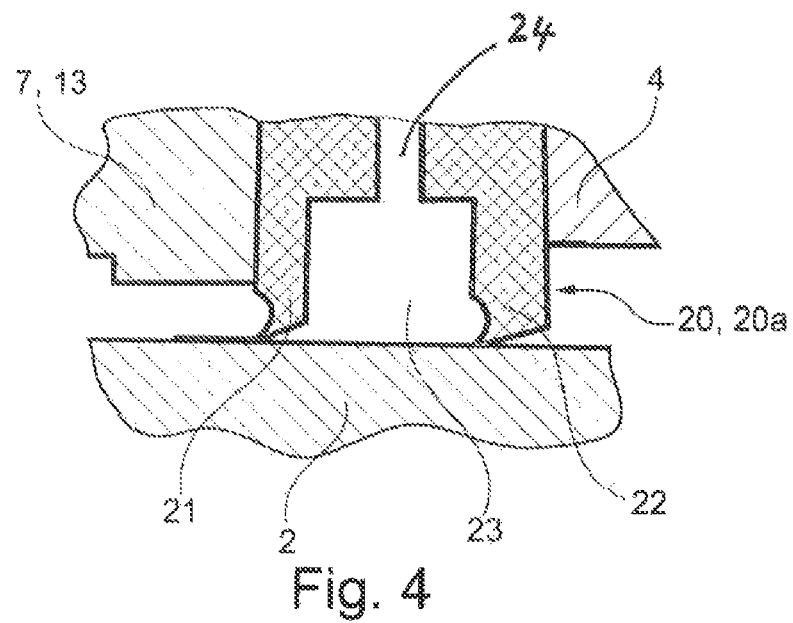
FIG. 4 shows an enlargement from FIG. 3 in the form of a detail.

FIG. 4 shows clearly a cross section through the head seal 20. The head seal 20 according to the invention is provided with an inner sealing lip 21 and with an outer sealing lip 22. Both sealing lips 21, 22 basically bear sealingly against the guide rail 2. The inner sealing lip 21 is arranged behind the gaps 16 in the direction of flow of the hydraulic fluid. The outer sealing lip 22 seals off the guide carriage 1 with respect to the surroundings.

A drainage portion 23 of the drainage 17 is provided between the two sealing lips 21, 22. When the hydrostatic profile rail guide is in operation, the drainage portion 23 is exposed to a vacuum, so that hydraulic fluid is sucked in. If, then, hydraulic fluid wants to flow out from the gaps 16 surrounding the pressure pockets 15, it must first overcome a predetermined resistance of the inner sealing lip 21, while a pressure difference should be present in order to lift off the inner sealing lip. This pressure difference arises from the vacuum in the drainage portion 23 and the pressure of the hydraulic fluid at the end of the gaps 16 and in front of the inner sealing lip 21. When the pressure difference is reached, the inner sealing lip 21 lifts off from the guide rail 1 and allows the hydraulic fluid to pass into the drainage portion 23. The hydraulic fluid can be supplied from there into a reservoir and via an external line to an external pump again.

In this development according to the invention, the outer sealing lip 22 ensures that the hydraulic fluid remains in the drainage portion 23 and can flow only into a connected connecting duct 24, in which case the hydraulic fluid can be conducted from there, via a return duct 25 which can be seen in FIG. 3, to a preferably external pump.

In this exemplary embodiment according to the invention, the circumferential portion, provided with the two sealing lips 21, 22, of the seal 18 is produced in one piece together with the integrally formed connecting duct 24 from plastic by the injection-molding method.

LIST OF REFERENCE NUMERALS

1 Guide carriage
2 Guide rail
3 Head piece
4 Head piece
5 Pressure connection
6 Suction connection
7 Carrying body
8 Rail head
9 Rail foot
10 Foot portion
11 Bearing face
12 Bearing face
13 Back
14 Leg
15 Pressure pocket
16 Gap
16a Gap face
16b Gap face
17 Drainage
18 Seal
19 Side seal
19a Side portion
20 Head seals
20a Head portion
21 Inner sealing lip
22 Outer sealing lip
23 Drainage portion
24 Connecting duct
25 Return duct

The invention claimed is:

1. A hydrostatic mounting of longitudinally displaceably arranged machine parts, comprising:
pressure pockets for hydraulic fluid for building up a hydrostatic pressure between the machine parts;
gaps for the hydraulic fluid which are adjacent to the pressure pockets and are delimited by gap faces of the machine parts;
a drainage for the reception of hydraulic fluid; and
at least one seal, arranged effectively between the machine parts and surrounding the drainage, sealing against leakage of the hydraulic fluid out of the hydrostatic mounting,
wherein at least one circumferential portion of the seal has an outer sealing lip and an inner sealing lip, the inner sealing lip being adjacent to the gaps, and a low-pressure-loadable drainage portion of the drainage being arranged between the inner sealing lip and the outer sealing lip.

2. The hydrostatic mounting of claim 1, wherein, in a case of a specific pressure difference in front of and behind the inner sealing lip, the inner sealing lip lifts off from one machine part and allows hydraulic fluid to pass into the drainage portion.

3. The hydrostatic mounting of claim 1, wherein the circumferential portion, produced from plastic, of the seal connects the inner sealing lip and the outer sealing lip to one another in one piece, the circumferential portion having a connecting duct which connects the drainage portion to a return duct provided on one of the machine parts.

4. A guide carriage of a hydrostatic profile rail guide with a hydrostatic mounting of claim 1, one machine part being formed by the guide carriage which is mounted hydrostatically on a guide rail forming the other machine part and which is designed with a U-shaped cross-section, the guide carriage has a back and two legs, by which the guide rail is partially surrounded.

5. The guide carriage of claim 4, wherein the seal is arranged effectively between the guide carriage and the guide rail, and the seal has a plurality of portions which are formed by side portions and head portions, and, in each case, at least one of the side portions, which extend along the guide rail, is provided between each leg and the guide rail, and, in each case, at least one of the head portions, which is arranged transversely with respect to the guide rail, is arranged on both head sides of the guide carriage, and the head portion of the seal forming the circumferential portion, having the inner sealing lip and the outer sealing lip, of the seal.

6. The guide carriage of claim 5, wherein the seal surrounds the pressure pockets and the gaps adjacent to the pressure pockets, the drainage portion, arranged between the inner sealing lip and the outer sealing lip, of the circumferential portion of the seal being connected to a return duct of the guide carriage.

* * * * *